UNITED STATES PATENT OFFICE.

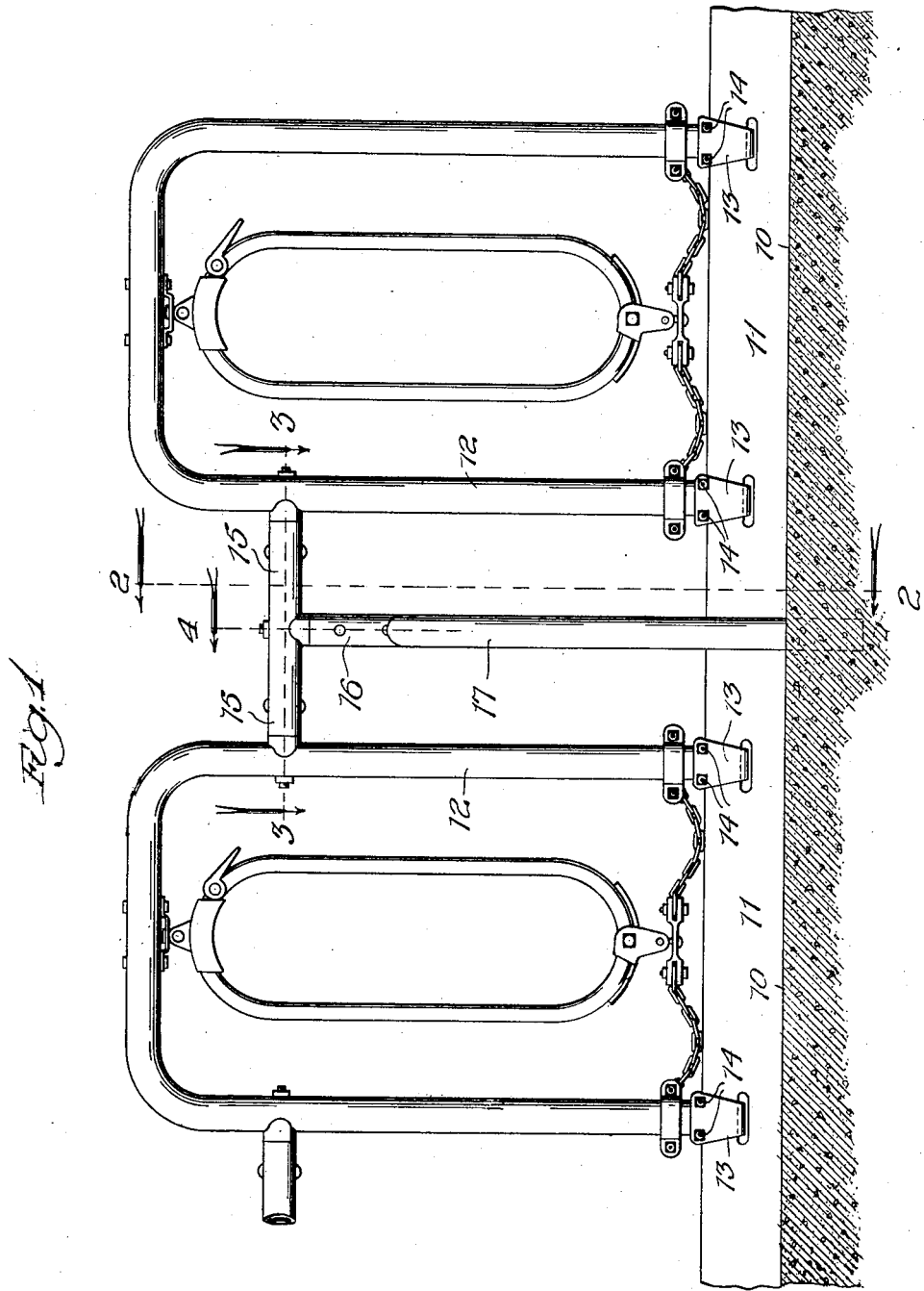

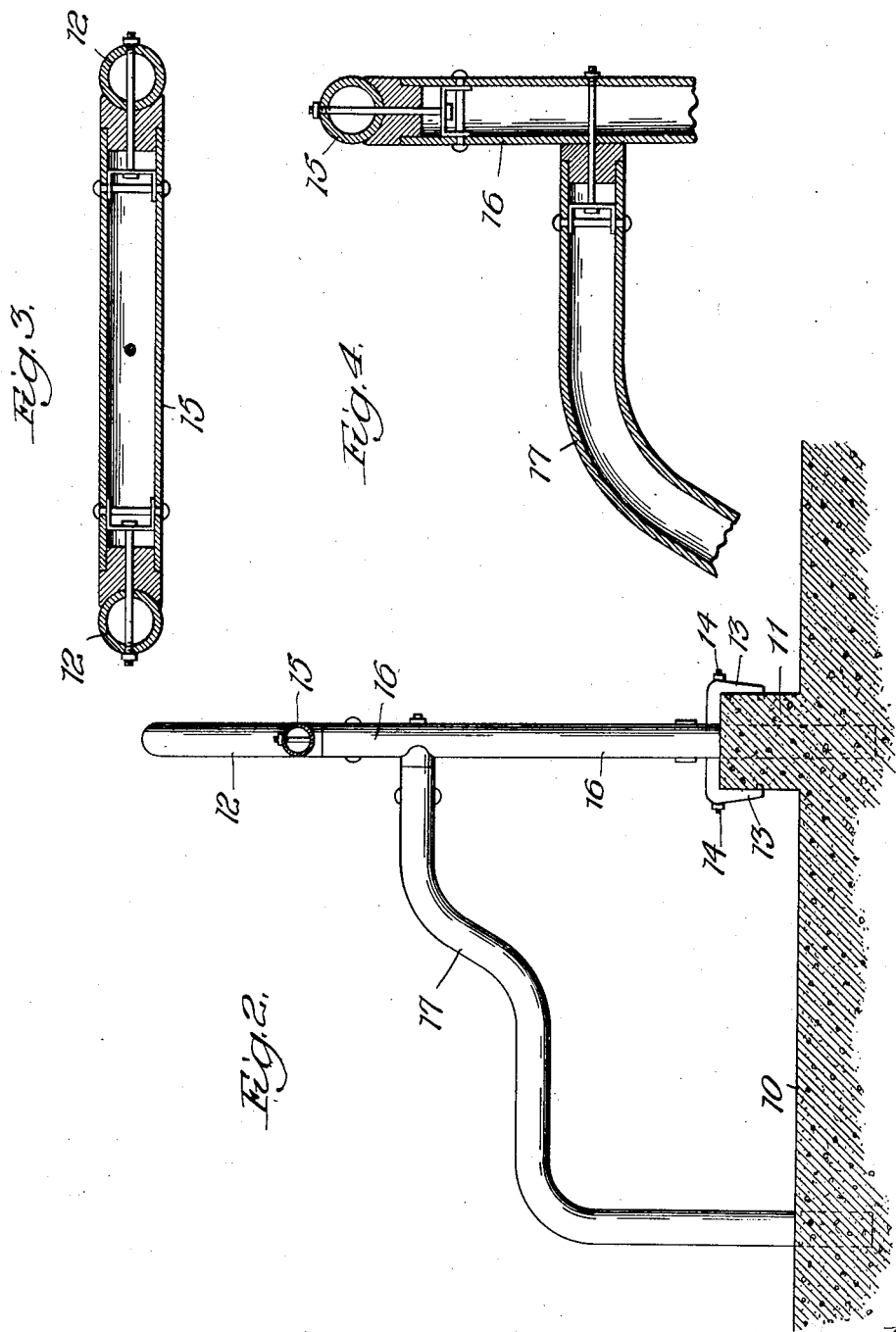

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

STALL CONSTRUCTION.

1,347,941. Specification of Letters Patent. Patented July 27, 1920.

Application filed February 16, 1920. Serial No. 359,070.

*To all whom it may concern:*

Be it known that I, HENRY L. FERRIS, a citizen of the United States, residing at Harvard, in the county of McHenry and State of Illinois, have invented a new and useful Stall Construction, of which the following is a specification.

This invention relates to the construction of animal stalls and is fully described in the following specification, as shown in the accompanying drawings, in which—

Figure 1 is a rear elevation of a stall embodying my invention.

Fig. 2 is a vertical section on the line 2—2 of Fig. 1, and

Figs. 3 and 4 are detail sections on the lines 3—3 and 4—4 of Fig. 1.

The floor 10 of the stall preferably has a curb 11 running transversely of the stall, to which the stall fronts 12 may be secured at their lower ends in any desired manner, as by means of clamps 13 and bolts 14. The upper end of the frame 12 is preferably arched and is secured to a cross member 15 at each side thereof, in the manner illustrated in Fig. 3.

The cross member 15 is similarly secured to the vertical member 16, as shown in Fig. 4, and this is secured in any desired manner, as shown in Fig. 2, to the curb 11. To each one of the vertical members 16 is secured the forward end of a partition member 17, as shown in Fig. 4. The rear end of each partition member is secured in any desired manner to the floor 10.

By this construction I have secured a stall which is unusually simple, rigid and strong, and at the same time economical to manufacture. The use of the vertical member 16 prevents the animal's head from being thrust through between the arched fronts 12 and permits of a narrower arch than would otherwise be the case.

While I have shown and described but a single embodiment of my invention it will be understood that numerous modifications may be made. Changes therefore in the construction and arrangement may be made which do not depart from the spirit and scope of the invention as disclosed in the appended claims in which it is my intention to cover all the novelty inherent in the device as broadly as possible in view of the prior art.

What I claim as new and desire to secure by Letters Patent is:—

1. In an animal stall, in combination, a floor, a single vertical member secured to the floor, a transverse member mounted on the upper end of said vertical member, a partition member secured to the floor and to said vertical member, and stall-front forming members secured to said transverse member and said floor.

2. In animal stall equipment, in combination, a floor, a series of stall fronts secured to the floor, a plurality of single vertical members secured to the floor, one of each of said members being interposed between each pair of stall fronts, a transverse member mounted on the upper end of each of said vertical members, the adjacent members of said stall fronts being secured to said transverse members, and a partition member between the stalls and secured to said vertical member and to the floor.

HENRY L. FERRIS.